United States Patent [19]

Mallary et al.

[11] Patent Number: 5,226,966
[45] Date of Patent: Jul. 13, 1993

[54] APPARATUS FOR PROVIDING UNIAXIAL ANISOTROPY IN A MAGNETIC RECORDING DISK

[75] Inventors: Michael L. Mallary, Berlin, Mass.; Kazuo Ishibashi, Matsudo; Hiroshi Sato, Kanagawa, both of Japan

[73] Assignee: Digital Equipment Corporation, Maynard, Mass.

[21] Appl. No.: 797,504

[22] Filed: Mar. 2, 1992

Related U.S. Application Data

[62] Division of Ser. No. 629,191, Dec. 26, 1990, Pat. No. 5,147,679.

[30] Foreign Application Priority Data

Dec. 27, 1989 [JP] Japan .................................. 1-339705

[51] Int. Cl.⁵ .............................................. H01F 1/00
[52] U.S. Cl. .................................................... 118/623
[58] Field of Search ........................... 118/623; 427/48

[56] References Cited

U.S. PATENT DOCUMENTS 4,745,001 5/1988 Mayoshi et al. ...................... 427/48

Primary Examiner—W. Gary Jones
Assistant Examiner—Charles K. Friedman
Attorney, Agent, or Firm—Clayton L. Satow; Barry N. Young

[57] ABSTRACT

An apparatus for providing radial uniaxial anisotropy in the soft magnetic layer of a magnetic recording disk is disclosed. While the soft magnetic layer is being deposited on the recording disk, the magnetic field. The alternating perpendicular magnetic field causes eddy currents to flow in the disk, in a circumferential direction. The eddy currents, in turn cause a magnetic field in a radial direction, thereby resulting in the desired radial uniaxial anisotropy.

11 Claims, 4 Drawing Sheets

APPARATUS FOR PROVIDING UNIAXIAL ANISOTROPY IN A MAGNETIC RECORDING DISK

This is a divisional application of copending application Ser. No. 07/629,191, file Dec. 26, 1990, by Mallary et al., now U.S. Pat. No. 5,147,678 entitled "Method and Apparatus for Providing Uniaxial Anisotropy in a Magnetic Recording Disk", and assigned to the assignee of the present application.

This invention relates to the manufacture of magnetic recording disks that are used to store information for computers. It relates to methods for aligning the magnetic material of a layer of the disk coating, in order to improve the magnetic characteristics of the magnetic recording disks. Specifically, it describes a method for providing uniaxial anisotropy to the magnetic layers of the magnetic recording disk.

BACKGROUND OF THE INVENTION

Magnetic recording disks are a popular and important form of storing large quantities of information (so-called "mass storage") for computers. Relative to other forms of mass storage, they are reliable, easy to manufacture, capable of storing large amounts of data, and allow rapid storage and retrieval of information. They consist of a disk, typically of a metal such as aluminum, on which is deposited a coating of magnetic material. Conceptually, the disk is divided into concentric circles ("tracks"). Radial lines divide the disk into pie shaped "sectors". Information is stored on the disk by applying a local magnetic field to a portion of a given track in a given sector. The magnetic material at that location stores the applied magnetic field. The information can later be read by examining where the stored magnetic field changes direction. The locations at which the magnetic field changes direction are known as "transitions".

One method of categorizing magnetic recording disks is whether they are "longitudinal" or "vertical". Vertical disks are sometimes referred to as "perpendicular".

In a longitudinal disk, the magnetic fields of the coating are aligned in a predominantly circumferential direction. Transitions occur when the magnetic field changes from clockwise to counterclockwise and vice versa. At certain locations on the disk, the magnetic field may have both a radial and a circumferential component, but only the circumferential component is read.

In a vertical disk, the magnetic field is in a direction along an axis perpendicular to the plane of the disk. Transitions occur when the magnetic field changes from upward to downward, and vice versa.

It is desirable to store as much information as possible on each disk. One method of doing so is to make the tracks as narrow and as close together as possible. However doing so can increase the problem of "noise". One kind of noise is caused when reading to or writing from a location interferes with the data that is stored in a nearby location, or when reading information at nearby locations is mistakenly read as the data stored at the intended location.

Another important characteristic of magnetic recording disks is signal strength. The greater signal strength a magnetic field has, the less the likelihood that "noise" will cause erroneous readings. Unfortunately, increasing the track density decreases the signal strength.

Thus, as track densities increase, it is important to find ways to reduce noise. One method of doing so is to introduce a second layer of magnetic material between the substrate and the magnetic coating that stores the data. This second layer of magnetic material is of a material that does not retain its magnetic field when the current which induces it is removed. Such materials are often referred to as "soft" magnetic layers. Materials that maintain their magnetic field when the current that induces them is removed are referred to as "hard", and layers of such materials are referred to as "hard magnetic layers". The thickness of a hard magnetic layer is dependent on factors such as the distance between the disk and the read/write head (the "fly height), and the density of the recording. In a longitudinal disk, the hard magnetic layer is typically on the order of 2 micro-inches thick, and the soft magnetic layer, if included, is approximately the same thickness as the hard layer. In a vertical disk, the hard magnetic layer is typically on the order of 4 to 20 micro-inches thick. The thickness of the the soft magnetic layer is depend thickness of the write pole, and is typically 16 to 20 micro-inches thick.

Unfortunately, a soft magnetic layer has the property of decreasing the signal strength of a longitudinal disk. This property can be alleviated, however, by placing a layer of magnetically inert material between the soft magnetic layer and the hard magnetic layer. The thickness of the magnetically inert layer is dependent on the fly height. A typical thickness of an inert layer is 5 to 10 micro-inches.

Other aspects of soft magnetic layers in longitudinal recording are described in U.S. patent application 07/103,965, entitled Magnetic Medium for Longitudinal Recording, filed Oct. 5, 1987 by Mallary, et al, and and assigned to the assignee of the present application. In Mallary, the uniformity of the pulse shape and the minimization of soft layer induced noise is enhanced by a radial orientation of the easy axis of magnetization of the soft magnetic layer.

In a vertical disk the soft magnetic layer has the property of increasing the signal strength. This is a highly desirable property, because, as information density increases, signal strength tends to decrease.

The beneficial properties of a soft magnetic layer can be enhanced by orienting the magnetic material such that their magnetic field is oriented in one direction, thus establishing a direction in which the aggregate magnetic field of all the material is stronger; the property of having one direction in which the magnetic field is stronger is called "uniaxial anisotropy". The direction in which the magnetic field is stronger is often referred to as the "easy axis", or the "uniaxial anisotropic axis". The axes perpendicular to the "easy axis" are referred to as "hard axes". In a magnetic recording disk it is common to ignore the hard axis that is perpendicular to the plane of the disk, and to use the term "hard axis to refer to the axis coplanar with the disk and perpendicular to the easy axis.

In one embodiment of the magnetic recording disk medium using the vertical magnetic recording method, there is a so-called two-layer film medium consisting of a vertical hard magnetic layer n between, a soft magnetic layer made from Permalloy. The recording and reproduction characteristics of this two-layer medium are strongly dependent on the magnetic characteristics of the soft magnetic layer.

In general, the permeability of the soft magnetic layer along the hard axis is higher than the permeability of the soft magnetic layer along the easy axis; therefore, in order to obtain good recording and reproduction characteristics, it is necessary to align the hard axis of the soft magnetic layer to the direction of the tracks (circumferential direction) of the magnetic recording disk. A method for doing this, disclosed in Japanese Kokai Patent No. Sho 62[1987]-129940 is shown in FIG. 1. An inner magnet 92 placed in the center of the uncoated disk 91 and an outer magnet 93 is placed at the outer edge of of the disk. The poles of the magnets are aligned such that the lines 94 of the magnetic field are in a radial direction from the center of the disk base. When the soft magnetic layer is deposited, typically by sputtering, the magnetic field causes the magnetic material to align such that the easy axis is in a radial direction, and the hard axis is in a circumferential direction.

However, when applying this method using the magnets described above for the production of the magnetic recording disk medium using in-line sputtering apparatus, the magnets have to be field, in the radial direction, at the surface of the disk base with sufficient intensity (approximately 10 oersted) normally required for this process.

Moreover, although it is sufficient to fix the outer magnet surrounding the outer circumference of the disk base, on the pallet (base holder), it is necessary to attach the inner magnet to the base itself in order for the soft magnetic layers to be formed simultaneously on both surfaces of the disk base. But this is undesirable due to the increase in the number of processing steps and the forming of dust during the mounting and dismounting of the magnet.

If this process is used during the formation of a vertical disk, there is an additional problem. During the forming of the vertical magnetized layer that follows the forming of the vertical magnetic layer tends to worsen due to the magnetic field, whose lines of force extend radially outward from the central magnet, in the direction of the surface of the disk base.

SUMMARY OF THE INVENTION

The objective of the present invention is to solve the above-mentioned problems in the manufacturing of the magnetic recording disk by providing a method for the forming of the soft magnetic layer. The method provides a magnetic field in the radial direction from the center of the disk. The magnetic field has sufficient intensity to cause the easy axis to be in a radial direction. The magnetic field is formed without requiring the use of parts such as magnet or coil to be mounted on and dismounted from the disk board itself, and also provides simultaneous forming of magnetic layers on both surfaces of the disk base, with the easy direction of magnetization in the radial direction, using an in-line sputtering apparatus or other deposition method such as a plating bath. If desired, the magnetic field in the radial direction from the center of the base is easily removable during the forming of the other magnetic layers.

In order to accomplish the objective described above, the present invention uses an alternating magnetic field with constant intensity in concentric circles centered at the center of the disk base but varying in strength with the distance from the center, or, alternatively, uses an alternating magnetic field with uniform intensity. The magnetic field is applied perpendicular to the surface of the electrically conductive disk base which is made from electrically conductive material such as aluminum, thus producing concentric circular eddy currents in the disk base by electromagnetic induction. A magnetic field in the radial direction from the center of the disk base is produced by these eddy currents, and this magnetic field causes the easy axis of the magnetic layer to be in the radial direction of the disk base and the hard axis of the disk to be in a circumferential direction. The alternating magnetic field being applied is produced by coils so that it can be removed easily during the forming of the hard magnetic layer.

The intensity of the magnetic field, in the radial direction on the disk base, produced by the eddy currents, is proportional to the product of the amplitude and the frequency of the alternating magnetic field being applied. Therefore, when an adverse influence on the plasma state of the sputtering occurs caused by the externally applied alternating magnetic field, the adverse influence can be eliminated by decreasing the intensity (amplitude) of the alternating magnetic field, and at the same time by increasing the frequency of the alternating magnetic field, such that the intensity of the magnetic field, in the radial direction, produced by the eddy currents can be maintained. The influence on the soft magnetic layer due to the alternating magnetic field applied perpendicular to the disk base can be reduced in the same fashion.

The intensity of the applied alternating perpendicular magnetic field can be reduced even further by shaping its wave form into a triangular shape. The induced eddy currents and their resultant radial field will then have a square wave shape. This keeps the induced field above the necessary minimum with smaller peak values of the perpendicular source field. Also the amount of time spent in switching (twice per cycle) is reduced so that the field is above the minimum for a higher percentage of the cycle. The purpose of wave form shaping is to obtain a resultant square wave shape for the induced eddy currents and their resultant radial field. At frequencies near or above the characteristic frequency of the disk( $F=R/(2*Pi*L)$, where R is the resistance around the disk and L is the inductance) this goal is obtained with a distorted triangular wave shape to the source field. At frequencies very much greater than the characteristic frequency a square wave source field will result in a square wave induced field. Therefore the optimum wave form for the perpendicular drive field is frequency dependent and disk dependent.

When the disk base is made from electrical insulators such as glass, ceramic and the like, the present invention can be applied by first forming a metal layer on which the eddy currents can occur, with suitable thickness, made from metal such as aluminum or titanium, on the base, before the forming of the magnetic layer.

The invention will now be described in more detail, which can be best understood by reference to the following drawings.

DETAILED DESCRIPTION OF THE INVENTION

Figure 1:
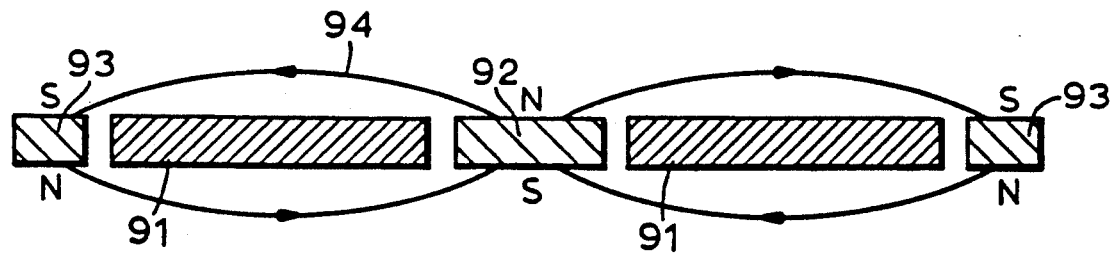
FIG. 1 is a diagrammatic cross-section of a prior art method of accomplishing the same result as the present invention.
Figure 2:
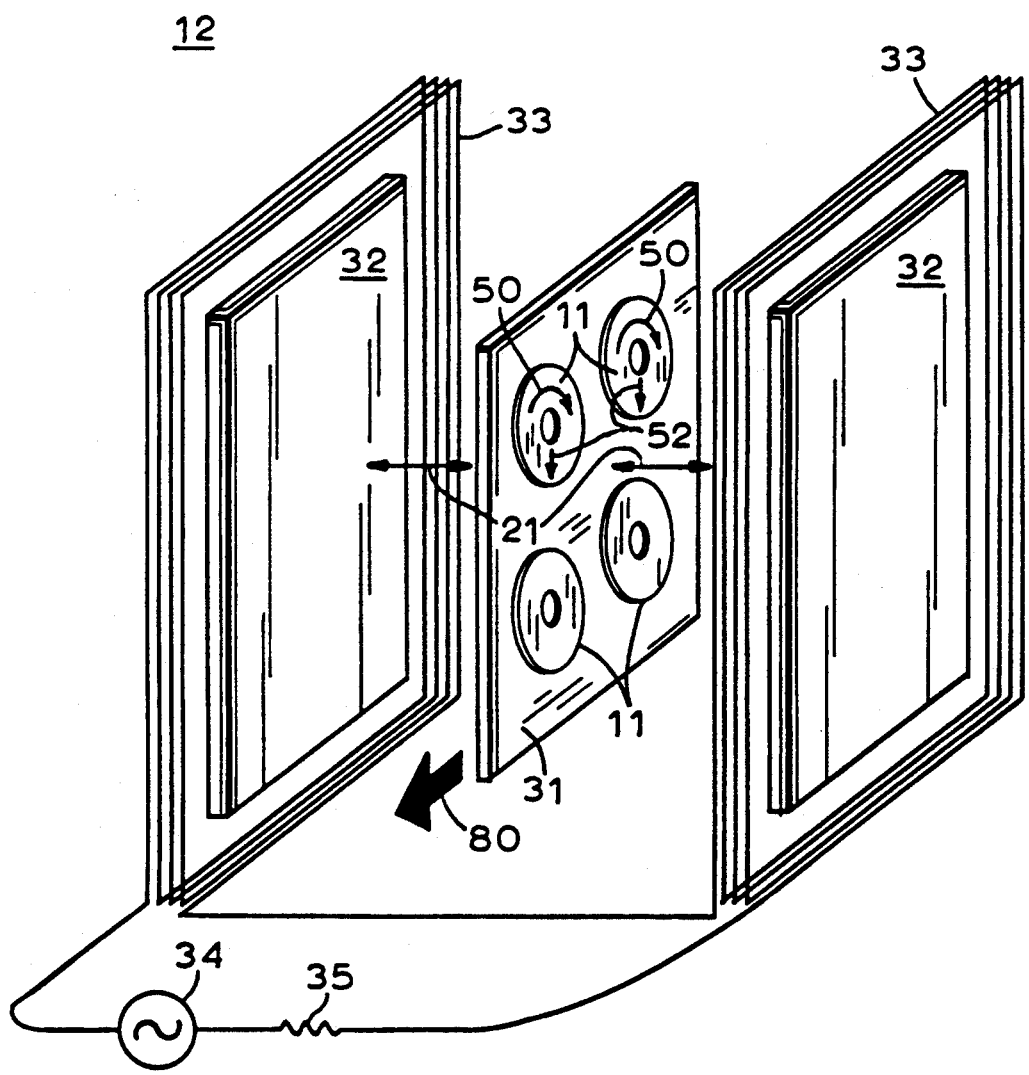
FIG. 2 is a diagrammatic view of the apparatus used in one embodiment of the invention.

FIG. 2 shows an application of the present invention with an in-line sputtering apparatus. Those skilled in the art will recognize that the process is readily adaptable to other forms of deposition of the magnetic layer, such as evaporation and electroplating.

A number of disk bases 11 are mounted on the pallet 31. The alternating power source 34 is connected through the resistor 35 to the coils 33 used to produce the alternating magnetic field. Waveform transmitted by alternating power source 34 is illustrated as a sinusoidal waveform, but it is understood that other waveforms, such as triangular waves can be used. Coils 33 are generally identical and rectangular in shape and formed of multiple windings. The planes of coils 33 are parallel to one another and to the pallet 31, passing therethrough. Soft magnetic material targets 32 are placed inside the coils 33 so that sputtering is performed by passing pallet 31 mounted with the disk bases 11 between them in the direction indicated.

Under this arrangement, an alternating current, supplied by the power source 34, flows through the resistor 35 and coils 33 and produces the alternating magnetic field 21 indicated by double ended arrows in a direction perpendicular to the plane of the coils 33. The alternating magnetic field 21 produces concentric circumferential eddy currents 50 in the disk base 11, and in turn, this eddy currents produce the magnetic field 52, in the radial direction, in the disk base. For example, by applying a 50 hertz, 65 oersted alternating field perpendicular to a 5.25 in diameter, NiP plated aluminum base (1.9 mm thickness), a magnetic field, in the radial direction, with intensity of approximately 10 oersted at the outmost circumference was produced.

Coils 33 can also be placed outside the vacuum tank of the sputtering tank. It is necessary to prevent any eddy currents that may occur in pallet 31 from interfering with electrically insulating disk bases 11 from pallet 31 or by constructing pallet of a weakly conductive material such as stainless steel.

Figure 3:
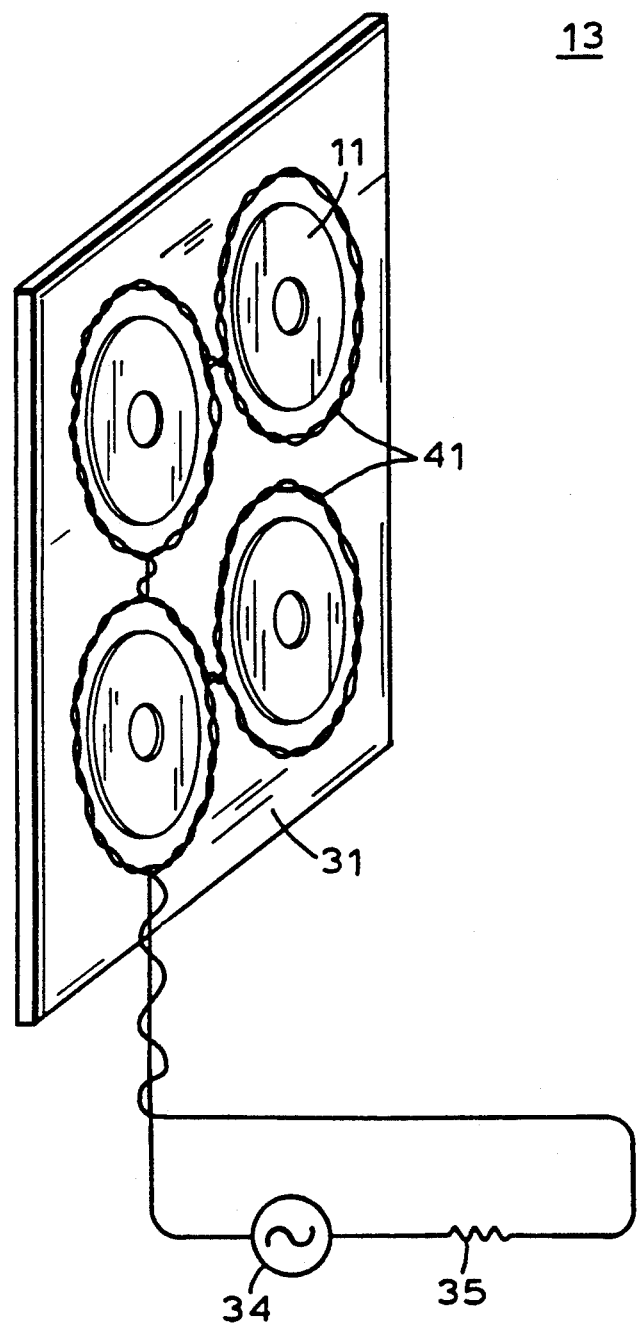
FIG. 3 is a diagrammatic view of the apparatus used in an alternative embodiment of the invention.

FIG. 3 shows an alternative way of producing the alternating magnetic field being applied to the disk bases 11. A coil 41 is placed around the immediate outside of each disk bases 11 which is mounted on the pallet 31. Each coil 41 is circular in shape and of a diameter slightly greater than the diameter of the disk base 11. By connecting the coils 41 to the alternating power source 34 through the resistor 35, an alternating magnetic field perpendicular to the disk base 11 is produced. In this case, by alternating the direction of the winding of adjacent coils, magnetic fields produced from adjacent coils can be used; furthermore, the intensity of the magnetic field, produced by all coils on the pallet, near the surface of the targets can be reduced.

Figure 4:
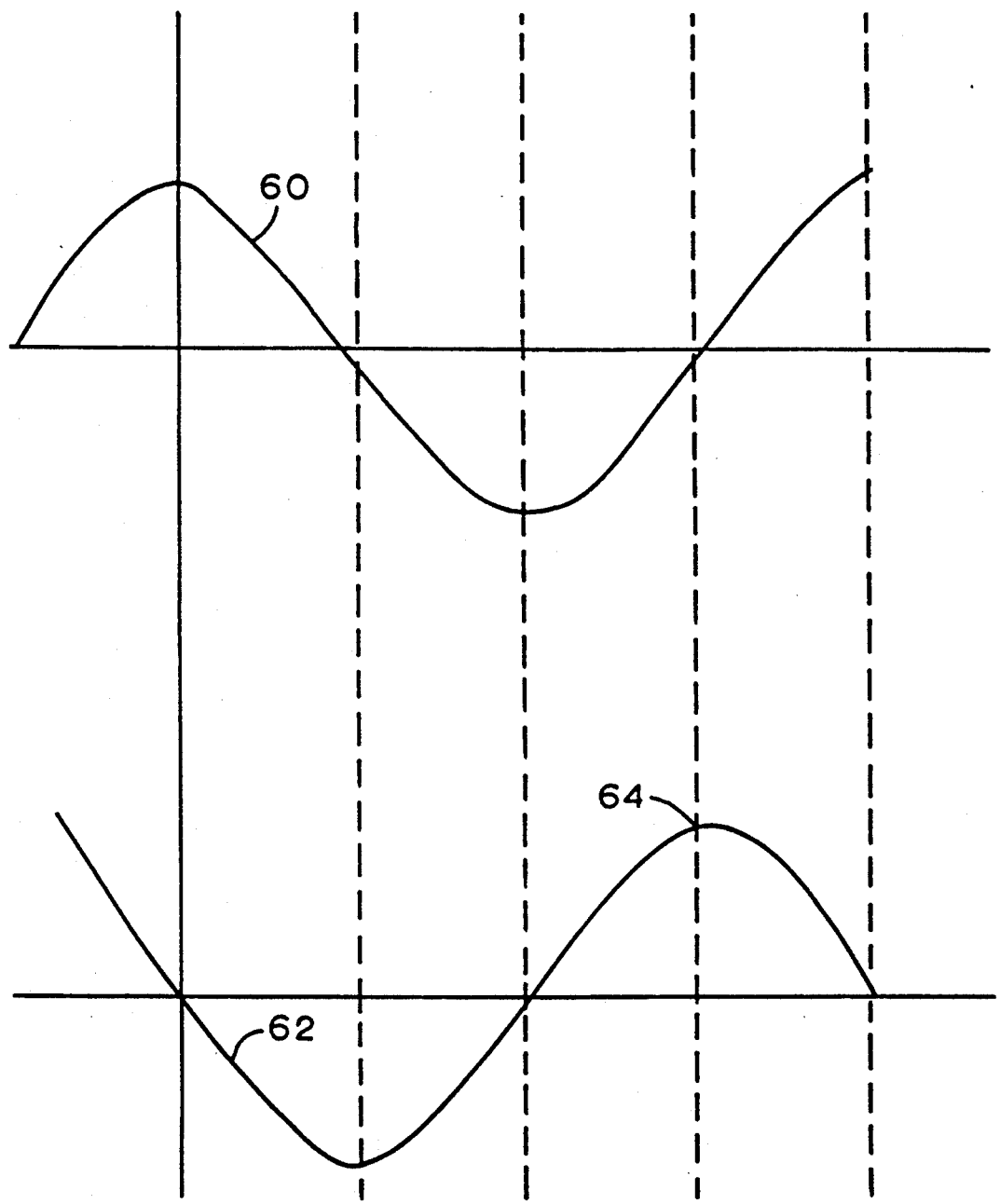
FIG. 4 is a timing diagram showing the strength of the applied perpendicular magnetic field in a sinusoidal waveform and the amplitude of the resultant eddy current

In FIG. 4 the alternating perpendicular magnetic field has a sinusoidal waveform 60. Since the amplitude of the resultant eddy currents is proportional to the first derivative of the strength of the perpendicular magnetic field with respect to time, the amplitude of the resultant eddy current follows a cosine curve 62 (that is, a sine curve offset by one fourth of a cycle). Thus, it can be seen that the eddy current has a maximum amplitude 64 for only a short interval.

Figure 5:
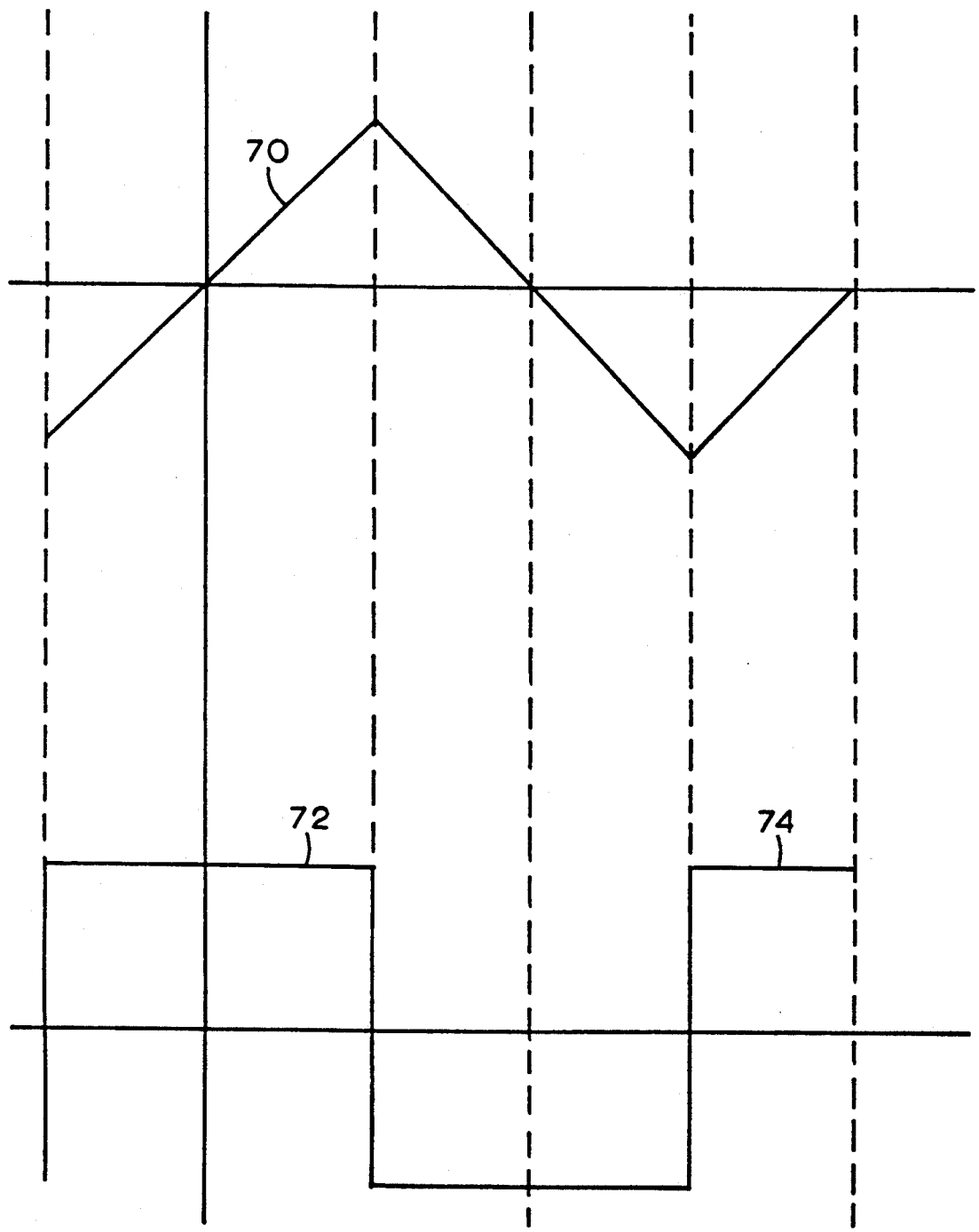
FIG. 5 is a timing diagram showing the strength of the applied perpendicular magnetic field in a triangular waveform and the amplitude of the resultant eddy current We will now proceed to describe the invention in greater detail.

In FIG. 5, the alternating perpendicular magnetic field has a triangular waveform 70. Since the amplitude of the resultant eddy currents is proportional to the first derivative of the strength of the perpendicular magnetic field with respect to time, the amplitude of the resultant eddy current is a square wave 72. Thus, it can be seen that the eddy current has a maximum amplitude 74 for a relatively long length of time. The strength of the magnetic field resulting from the eddy current is proportional to the amplitude of the eddy current. Therefore, as compared to a sinusoidal wave, a triangular waveform 70 produces a stronger magnetic field than a sinusoidal waveform, thereby creating a higher degree of uniaxial anisotropy. Alternatively, the same degree of uniaxial anisotropy can be attained with lower amplitude perpendicular magnetic field if the perpendicular magnetic field has a triangular wave rather than a sinusoidal waveform.

The invention having been described, it will be apparent to those skilled in the art that the invention can be practiced in many other ways, while still remaining within the scope of the appended claims.

We claim:

1. Apparatus for manufacturing a magnetic recording disk, comprising:
   means for creating an alternating magnetic field;
   means for depositing a magnetic coating on said disk and
   means for exposing said disk to said alternating magnetic field while said depositing means is depositing said magnetic coating on said disk.

2. Apparatus for manufacturing a magnetic recording disk as in claim 1, said depositing means further comprising a sputtering apparatus.

3. Apparatus for manufacturing a magnetic recording disk as i claim 1, said depositing means further comprising a plating apparatus.

4. Apparatus for manufacturing a magnetic recording disk comprising:
   means for creating an alternating magnetic field, including:
      a source for an alternating electrical current;
      two coils, electrically connected to said current source;
      two soft magnetic material planar targets, each lying within one of said coils, and coplanar with the plane enclosed by said coil, wherein said current flowing through said coils causes a magnetic field between said soft magnetic material targets;
   means for depositing a magnetic coating on said disk, and
   means for exposing said disk to said alternating magnetic field while said depositing means is depositing said magnetic coating on said disk.

5. Apparatus for manufacturing a magnetic recording disk as in claim 4, said coils consisting of multiple windings.

6. Apparatus for manufacturing a magnetic recording disk as in claim 4, said coils being rectangular in shape.

7. Apparats for manufacturing a magnetic recording disk as in claim 4, said targets being placed parallel to each other.

8. Apparatus for manufacturing a magnetic recording disk as in claim 4, said exposing means further comprising a planar pallet for mounting said disks, said pallet being adapted to pass between said targets.

9. Apparatus for manufacturing a magnetic recording disk as in claim 4, said alternating electrical current source being capable of producing a current with a sinusoidal waveform.

10. Apparatus for manufacturing a magnetic recording disk as in claim 4, said alternating electrical current source being capable of producing a current with a triangular waveform.

11. Apparatus for manufacturing a magnetic recording disk, comprising:

a source for an alternating electrical current; two coils, electrically connected to said current source, said coils consisting of multiple windings;

two soft magnetic material planar targets, each lying within one of said coils, and coplanar with the plane enclosed by said coil, wherein said current flowing through said coils causes a magnetic field between said soft magnetic material targets, said targets being placed parallel to each other;

a planar pallet for mounting said disks, said pallet being adapted to pass between said targets, and means for depositing a magnetic coating on said disk.

* * * * *